(12) United States Patent
Dickens

(10) Patent No.: US 7,047,331 B2
(45) Date of Patent: May 16, 2006

(54) INTERFACING DEVICES

(75) Inventor: Nigel Anthony Dickens, Cambridge (GB)

(73) Assignee: Adder Technology Ltd., Cambridge (GB)

( * ) Notice: Subject to any disclaimer, the term of this patent is extended or adjusted under 35 U.S.C. 154(b) by 130 days.

(21) Appl. No.: 10/370,279

(22) Filed: Feb. 18, 2003

(65) Prior Publication Data
US 2003/0188049 A1    Oct. 2, 2003

(30) Foreign Application Priority Data
Feb. 21, 2002   (GB) ................................ 0204035.0

(51) Int. Cl.
*G06F 13/12*    (2006.01)

(52) U.S. Cl. .................... 710/63; 710/2; 710/8; 710/73
(58) Field of Classification Search ............. 710/63–74
See application file for complete search history.

(56) References Cited

U.S. PATENT DOCUMENTS 6,671,756 B1 * 12/2003 Thomas et al. ............... 710/73
6,772,236 B1 *  8/2004 Williams et al. .............. 710/19
2002/0073304 A1 *  6/2002 Marsh et al. ................... 713/1

* cited by examiner

*Primary Examiner*—Kim Huynh
*Assistant Examiner*—Eron Sorrell
(74) *Attorney, Agent, or Firm*—Beyer weaver & Thomas LLP

(57) ABSTRACT

A device for interfacing an input device and a computer includes a microprocessor in communication with a memory, the memory storing download instructions and having a re-writable memory area for storing input device driver data downloadable by the microprocessor using the download instructions. The microprocessor is programmed to use the input device driver data to enable data transmission between the computer and the input device. In an alternative device, the microprocessor is programmed to extract input device driver data from data transmitted to the device in a standard input device protocol and to save the input device driver data in the memory. An upgradeable KVMA and KVM switch and extender including such devices are described.

22 Claims, 10 Drawing Sheets

INTERFACING DEVICES

BACKGROUND OF THE INVENTION

The present invention relates to devices for interfacing peripherals and computers, and in particular to devices allowing peripherals supporting various functionalities to be used with a computer or computers.

Computer input peripheral devices, such as keyboards, mice, joysticks, graphics tablets and other such devices, transmit data to and receive data from computers using a variety of different protocols. Common protocols include PS/2, Universal Serial Bus (USB), Apple Desktop Bus (ADB) and a protocol used by computers supplied by Sun Microsystems Inc (Sun), amongst others. (Sun is a trade mark of Sun Microsystems Inc, registered in some countries.) Different devices of one protocol can support different functionalities. For example, different PS/2 compatible mice can have different numbers of buttons. However, not all PS/2 compatible computers are configured to utilise the full range of functionalities and therefore use a reduced range.

Also, although a peripheral device and a computer may be intended to work together using the same protocol, if the protocol does not have a tightly defined standard, then it is not uncommon for supposedly compatible computers and peripherals not to work together owing to minor differences in the way the protocol has in fact been implemented.

There are also circumstances in which it is necessary to use an input device of one protocol with a computer using a different peripheral protocol. A common instance is when a KVM (Keyboard, Video monitor and Mouse) switch is used to connect a KVM console to a plurality of computers so as to allow the plurality of computers to be operated using the common peripherals.

KVM switches are available with a microprocessor which can be entirely re-programmed by downloading new program instructions (firmware) from a computer running a terminal program via a dedicated RS232 interface. This approach is acceptable for advanced KVM devices but the RS232 connector, extra microprocessor and associated circuitry increases the size, cost and complexity of the KVM switch.

There is therefore a need for a simple device allowing a fuller functionality of peripheral devices to be utilised when operating a computer.

SUMMARY OF THE INVENTION

According to a first aspect of the present invention, there is provided a device for interfacing an input device and a computer connected to the device, the device including: a microprocessor in communication with a memory, said memory storing download instructions and having a re-writable memory area for storing input device driver data downloadable by the microprocessor using the download instructions, the microprocessor being programmed to use the input device driver data to enable data transmission between the computer and the input device.

In this way device driver data can be downloaded in order to upgrade the device to enable a computer and input device having otherwise un-matching functionalities to be used together. The device enables data transfer using the input device driver data so that the functionality of the computer as seen by the input device and vice versa are more closely matched.

The input device driver data can be re-writeable to the memory independently of other data stored in the memory. In this way only the device driver data need be upgraded rather than the entire control program. Preferably device driver data for different devices can be re-written to the memory independently of other data. In this way the driver data for a keyboard, mouse, joystick, lightpen or any other input device can be upgraded without having to upgrade the driver data of any other input devices to be used with the device.

The download instructions can be protected from being overwritten by downloaded data. Preferably the download program is written so as not to overwrite areas of memory where it is stored.

The device driver data can include device driver instructions and driver data. This provides a more flexible way of providing drivers for different devices. Generic driver instructions can be written which can be tailored for different devices by changing the driver data only.

The driver data can include data selected from: data indicating conditions under which the driver code may look for certain data sequences; data identifying sequences of transmitted bytes; data indicating what the driver does when certain sequences of data are detected; state information telling the driver code what state the device is in when byte sequences are detected; data sent to the computer in response to a query from the computer; pointers to the location of other data items; and data that defines the sequences of data sent to the input device.

The driver data can be stored in a look up table. The look up table can be stored in the same memory as the driver instructions. The device can include an EEPROM accessible by the processor and the look up table can be stored in the EEPROM.

The memory can include a free area allocated to device driver data. The driver free memory area provides space in which more complicated downloaded drivers can be stored when the device is upgraded. Preferably, the free area is contiguous to device driver memory areas. This makes it easier to determine where the downloaded data is to be stored.

The memory can also store data transmission protocol conversion data. This allows input devices using a first transmission protocol and computers using a different transmission protocol to be used together. For instance a PS/2 keyboard or mouse with a Sun computer.

The memory can store data transmission and/or reception routines. The data transmission and/or reception routines used are the same for each type of protocol and so the driver data and transmission and/or reception routines can be stored separately and accessed independently. For instance a computer keyboard driver and a common mouse driver may both use the same transmission and/or reception routines for actually transmitting and receiving data.

The memory can store a download status data item. The download status data item helps to prevent incorrect re-programming of the device and helps to provide device recovery in case there is a download error.

The input device driver data can be for any kind of computer input device. Preferably, the device driver data is mouse and/or keyboard driver data.

The memory can store main control program data which is re-writable. In this way the overall performance of the device can be changed either together with or independently of the driver data.

According to an aspect of the invention there is provided a method for configuring a device for interfacing an input device and a computer connected to the device, the method including: downloading input device driver data from the computer and storing the input device driver data in a re-writable memory area of a memory in communication with a microprocessor in the device, the microprocessor being programmed to use the input device driver data to enable data transmission between the computer and the input device. The method can include the step of using a download program stored in the memory to download the input device driver data.

Preferably, the input device driver data is stored independently of data already stored in the memory. In this way the driver data only can be updated without interfering with the other data present in the memory.

According to a second aspect of the invention there is provided a device for interfacing an input device and a computer connected to the device, the device including: a microprocessor in communication with a memory, the microprocessor being programmed to extract input device driver data from data transmitted to the device in a standard input device protocol and saving the input device driver data in the memory.

The standard input device protocol can be PS/2. The input device driver data is preferably transmitted in a "set typematic rate/delay" data sequence.

The microprocessor can be programmed to generate false key press data to communicate with the computer. In this way correct downloads can be verified.

According to a further aspect of the invention, there is provided a method for configuring a device for interfacing an input device and a computer connected to the device, the method including the steps of: transmitting input device driver data to the device in a standard input device protocol; extracting input device driver data from the standard input device protocol and saving the input device driver data in a memory in communication with a microprocessor in the device.

The standard input device protocol can be any protocol which can be used to transmit driver data, either encoded or not, to the device. Suitable protocols include USB, PS/2, ADB, Sun.

Preferably, the standard input device protocol is PS/2 and the input device driver data is transmitted as a "set typematic rate/delay" byte.

According to a further aspect of the invention, there is provided a KVM or KVMA switch or extender including a device according to the first or second aspect of the invention.

DESCRIPTION OF THE DRAWINGS

Embodiments of the invention will now be described, by way of example only, and with reference to the accompanying drawings, in which.

Figure 1:
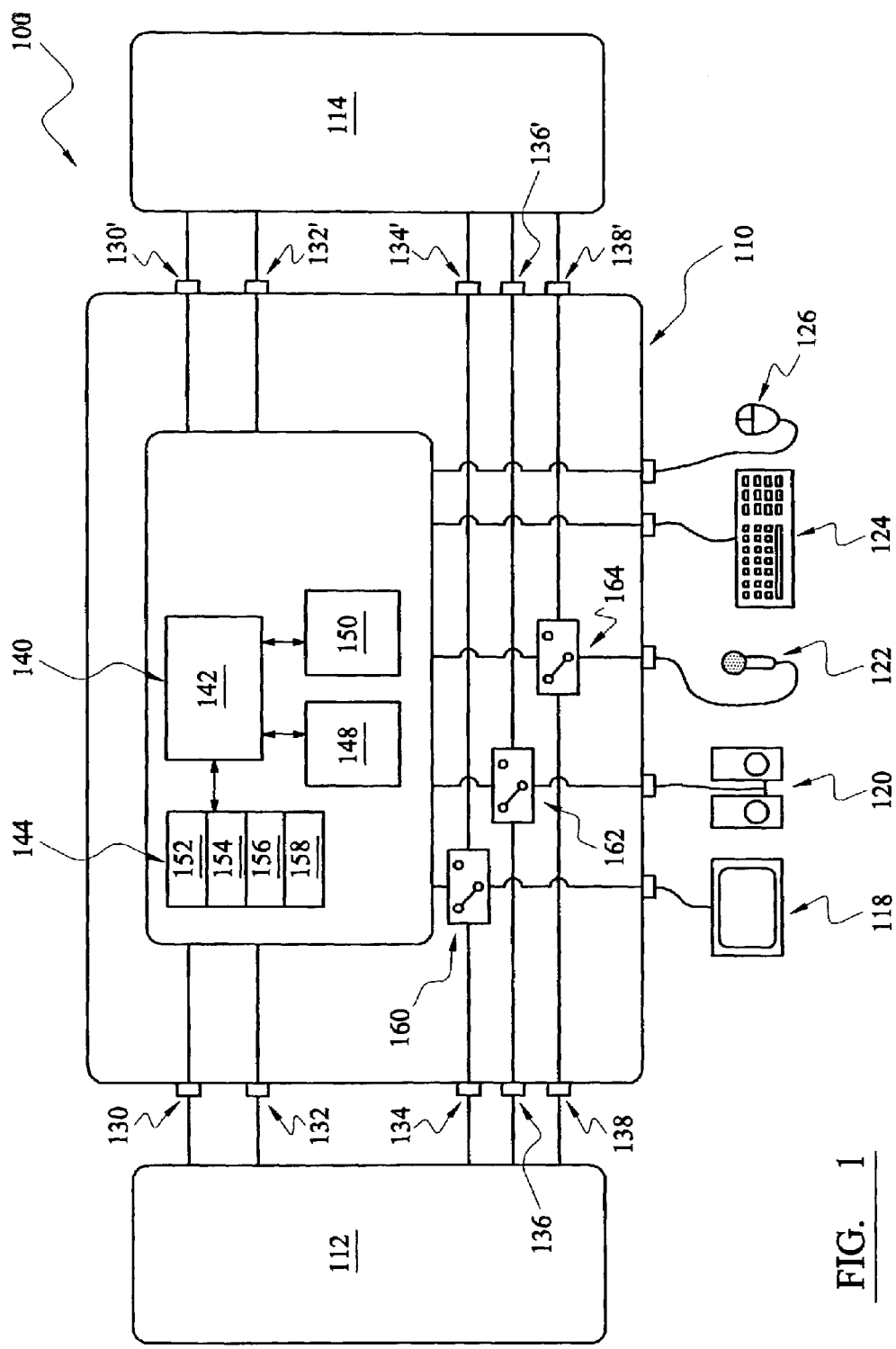
FIG. 1 shows a schematic block diagram of a KVMA switch including a device according to the invention.

Similar items in different figures share common reference numerals unless indicated otherwise.

DETAILED DESCRIPTION OF THE INVENTION

FIG. 1 shows a schematic block diagram of a computer system 100 including a KVMA (Keyboard, Video, Mouse and Audio) switch 110 connected to a first PS/2 compatible computer 112, a second PS/2 compatible computer 114, and a KVMA console 116. The KVMA console comprises a video monitor 118, a pair of speakers 120, a microphone 122, a PS/2 keyboard 124 and a PS/2 mouse 126. The monitor, speakers, microphone, keyboard and mouse are each connected by respective cables terminated in standard connectors to a connector socket of the switch 110. Similarly, the first and second computers are connected by respective cables and connectors to the keyboard 130, 130', mouse 132, 132' and video 134,134'. Respective speaker and microphone cables are connected by audio jack plugs to audio jacks 136, 136' and 138, 138'.

KVMA switch 110 includes a microprocessor based controller 140 which controls the routing of keyboard and mouse data and also the routing of video and audio signals between the computers and peripheral devices. The switch 110 also includes indicator lights and a manually operable selection switch (not shown) connected to the controller to select one of the computers. In addition to the selection switch, the controller is programmed to recognise keyboard hotkey sequences as a further way of selecting the computer to be connected to the KVMA console. FIG. 1 is schematic in nature and does not show ancillary electrical equipment or power supply components for the sake of clarity.

Switch 110 includes a video switching circuit 160 controlled by the controller 140 for selectively connecting the video monitor to one of the selected computers. The controller 140 provides a switch control signal to route video signals from the first or second computer to the monitor 118. The switched video signals include red, green and blue analogue video signals and horizontal and vertical synchronisation signals. The corresponding set of display data channel (DDC) signals are also switched through from the selected video connector to the common video connector. The DDC signals enable a computer to communicate with a monitor. This video switching circuitry is mainly implemented using analogue switches and common HCT/LS logic and uses 15 way high density D-connectors.

Stereo audio switching circuit 162 and microphone signal switching circuit 164 are also provided and are also controlled by switching control signals from the controller circuit 140. The audio switching circuits 162, 164 are implemented mainly using analogue switches and audio jack connectors.

The microprocessor based control circuit 140 controls the overall function of the KVMA switch and provides control signals to the video and audio switching circuits enabling them to route the video and audio signals between the computers and the shared monitor, speakers and microphone. The control circuit monitors the state of the selection switch and also switches the indicator lights on and off to indicate the selected computer.

Switching controller circuit 140 includes microprocessor 142 having on board re-writeable flash program memory 144. Microprocessor 142 also has on board RAM 148 and EEPROM 150 memories. An example of a suitable microprocessor is the PIC16F877, produced by Arizona Microchip Inc. Program memory 144 has areas for storing instructions and data associated with a main control program 152, mouse drivers 154, keyboard drivers 156 and a download program 158. The download program is written so as to prevent it overwriting itself in the area of memory in which it is stored.

Microprocessor 142 is programmed to control the transmission of keyboard and mouse data to and from the first and second computers via their respective connectors and cables. Microprocessor 142 also controls the transmission of data to and from the common keyboard 124 and mouse 126. PS/2 clock and data signals are routed between the computers, keyboard and mouse. Electrical power is also supplied to the keyboard from the KVMA switch via the keyboard cable. The keyboard power signal is fed through a low voltage drop bipolar transistor (not shown) and is controlled by the microprocessor. The microprocessor is thereby able to power down and re-set the keyboard if requested by a user of the switch. Mouse 126 is also powered from the switch via a power signal supplied over the mouse cable. The mouse power supply is also fed through the transistor allowing the microprocessor to power down and re-set both the keyboard and mouse as requested by a user.

Figure 2:
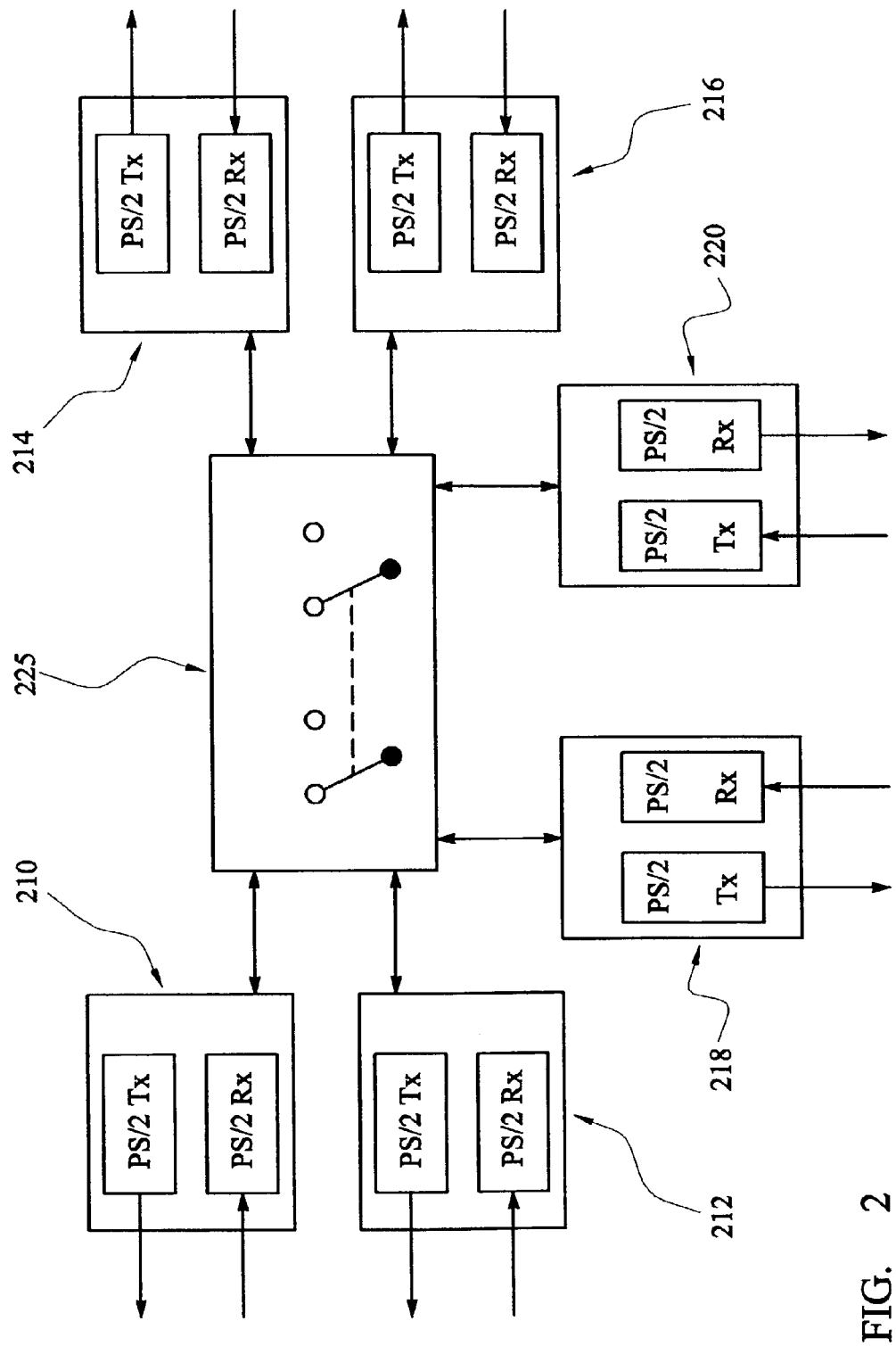
FIG. 2 shows a schematic block diagram illustrating the architecture of the functionalities of the device implemented by software.

FIG. 2 illustrates the functionality implemented by the firmware routines stored in the program memory 144 of microprocessor 142. The program memory includes a main control program 225 which controls the overall function of the switch and also controls routing of the data between the keyboard and selected computer. The program memory also includes a first computer keyboard driver program 210 and mouse driver program 212 including instructions to control the transmission of keyboard data and mouse data between the first computer and the switch. Similar second computer keyboard 214 and mouse 216 driver programs are provided to control the transmission of keyboard and mouse data between the switch and second computer. A common keyboard 218 and common mouse 220 driver program includes instructions to control the transmission of data between the switch and common keyboard and mouse.

In this embodiment, both computers and the keyboard and mouse use the PS/2 protocol for transmitting data. Therefore, each of the keyboard and mouse driver programs includes PS/2 transmission (PS/2 Tx) and receive (PS/2 Rx) routines. The PS/2 receive routine receives electrical data signals which are converted into data bytes that can be processed by the higher level driver. A PS/2 transmit routine is also provided to perform the reverse function of converting data bytes generated by the higher level driver into electrical signals that can be transmitted to the computer, keyboard or mouse as appropriate. The data receive and transmit routines are common to all PS/2 style devices and do not need to be changed for different devices, eg PS/2 mice supporting different functionalities. To change the action of the KVMA switch when different mice or keyboards are attached, the higher level driver routines 210, 212, 214, 216, 218 and 220 are changed.

For example, different mice respond to certain data sequences in different ways. A basic 2-button PS/2 style mouse will send its movement and button status report as a 3 byte packet. A Intellimouse with wheel, as provided by Microsoft Corporation, will send its report data as a 3 byte packet by default but will change to sending a 4 byte report that contains the wheel status information after it has received a certain sequence of bytes. By changing the mouse driver routine 220 to change the data packets transmitted from the KVMA switch, the switch can be made to emulate the presence of a computer loaded with a particular mouse driver. The mouse driver routine 220 generates and transmits the data sequence that causes the Intellimouse to switch into 4 byte reporting mode thereby emulating a computer loaded with an Intellimouse driver. The data receive and transmit routines are common to all PS/2 mice and do not need to be changed for different mice. Therefore it is only the mouse driver routine that needs to be changed in order to support different mouse functionalities.

Similarly, for PS/2 keyboards supporting different functionalities, it is only the keyboard driver 218 routine that needs changing as the PS/2 data receive and transmit routines are common.

Similarly the computer mouse and keyboard driver routines 210,212, 214, 216 are all that need changing in order for the switch to emulate to the attached computers the presence of a different type of PS/2 keyboard and/or mouse.

Figure 3:
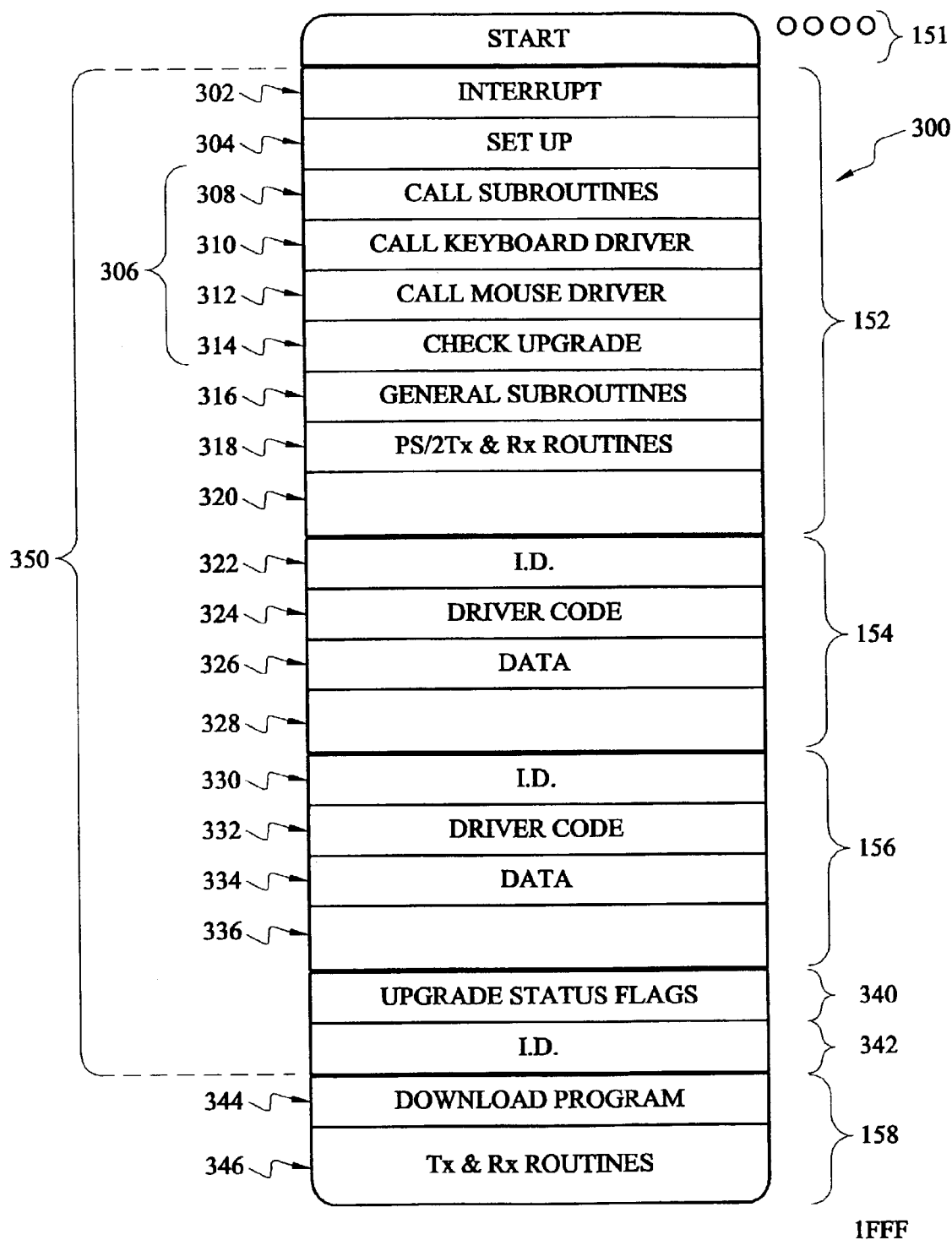
FIG. 3 shows a schematic memory map diagram illustrating the location of different data items in the program memory of the device.

FIG. 3 shows a memory map 300 for program memory 144. The program memory includes four main areas storing instructions and data which program the microprocessor 142 to control operation of the switch 110. A first main program memory area 152 includes data and instructions associated with the main control program. This area includes routines to handle program interrupts 302 and set up processes 304. Memory area 306 stores routines associated with a main control program including routines to call sub-routines 308, call keyboard drivers 310, call mouse drivers 312 and to check an upgrade status flag 314. Memory area 316 stores general subroutines used by the main control program and memory area 318 stores the PS/2 transmission and receive routines used by the mouse and keyboard drivers. Memory area 320 is a contiguous area of free memory allocated to the main control program.

Memory area 154 provides as continuous block of re-writeable program memory for storing mouse drivers 212, 216, 220. The mouse drivers include current driver version identifiers 322, driver instructions 324, driver data 326 and a contiguous area of free memory 328 allocated to the mouse driver programs. Memory area 156 is a keyboard driver memory area storing current driver version identifiers 330, keyboard driver instructions 332, keyboard driver data 334 and a contiguous area of free memory 336, allocated to the keyboard drivers.

Memory area 340 is used to a store a flag indicating the upgrade status of the switch. Memory area 342 stores an identifier for the version of the main control program currently stored in the program memory.

Memory area 158 stores instructions and data for a download program 344 and data transmission and receiving routines 346 used by the download program. The start address of the memory stores instructions causing the processor to jump directly to the download program on power up as will be described in detail below. The download program is written so as to prevent it overwriting the areas of memory storing itself 158 and the start of the memory area 151 storing the jump instructions.

Memory area 350 is re-writeable to allow for upgrades in the mouse and/or keyboard drivers, parts thereof, and/or the main control program. Free memory areas 320, 328 and 336 are provided to accommodate extra instructions and/or data downloaded to upgrade the program, mouse and/or keyboard drivers respectively. Area 320 of free memory is allocated to the main program. Free area memory 328 is allocated to the mouse driver and free memory area 336 is allocated to the keyboard driver. It is preferred if the free area of the program memory allocated to the mouse driver and keyboard driver respectively are contiguous although this is not essential provided that the location and size of the free memory areas are identifiable by the processor or can be derived. The free memory provides expansion space for drivers providing more complicated data transfers as required by more feature rich devices.

Mouse driver free memory 328 is shared between the mouse drivers 212, 216 and 220. Keyboard free memory area 336 is shared between the keyboard drivers 210, 214, 218. If insufficient free memory for a driver to be downloaded is available, then the processor uses a memory allocation system to determine those areas of free memory 320, 328, 336 available to store the download information and then mark them as allocated to the main program, mouse or keyboard drivers as appropriate.

By changing the mouse driver implemented by driver instructions 324 and driver data 326 the KVMA switch can be made to emulate the action of a particular mouse to the connected computers, irrespective of the actual common mouse connected to the switch. For example, if the mouse driver is to emulate an Intellimouse with a wheel then it will need to monitor the data sequences that are generated by the computer to determine if the computer is connected to an Intellimouse with a wheel. If the processor detects this data sequence from the computer, then the computer mouse driver 212, 216 will need to generate a data response to tell the computer that it supports the wheel function and switch itself to send 4 byte status reports to the computer that contain the wheel information in the same way that an Intellimouse would. The data transmission receive routines 318 do not need to be changed for different PS/2 mice.

To change the action of the KVMA switch to more closely match the computers to different mice, the blocks of memory 154 associated with the mouse driver are changed. Driver code 324 includes driver code for the first computer, second computer and common mouse drivers. Mouse driver data 326 includes driver data for the first computer, second computer and common mouse as required by the respective parts of the driver code. The keyboard drivers 210, 214 and 218 are configured and operate similarly to the mouse drivers, and work as described above mutatis mutandis.

The mouse and keyboard drivers are located in a fixed location and the free memory required for updates to the mouse or keyboard drivers is also located at a fixed location address. Alternatively, if the mouse and keyboard code and/or the free program memory addresses are located at variable locations then these locations are stored in the KVMA switch to allow the location of new keyboard and mouse drivers to be determined by reading those location addresses.

The routing of the keyboard and mouse data within the KVMA switch is controlled by the main control program 225 which accesses routing data stored in the processors RAM 148. Using routing data stored in RAM the routing control processes 225 controls the two way flow of data between the mouse driver 220 and the first computer mouse driver 212 and second computer mouse driver 216, and the drivers enable the selected computer and common mouse to operate together as though they have matched functionalities. Mouse movement data generated by the mouse driver 220 is buffered and then sent to the currently selected computer according to control information provided by the routing control process 225. Similarly, mouse configuration information that has been received from the selected computer via the relevant computer mouse driver 212, 216 is routed and sent to the mouse via the mouse driver 220 according to control information providing by the routing control process 225.

In order to configure the KVMA switch to more closely match the functionalities of the mouse to those of the selected computer, the areas of program memory associated with the mouse driver can be re-written by downloading new mouse driver instructions or data from the first or second computer. By changing the common mouse driver 220 the KVMA switch can be made to emulate the action of a computer loaded with the appropriate mouse driver for the actual mouse connected. This ensures that the mouse will communicate all the required information to the switch. For example, the mouse driver 220 may be updated so that it triggers an attached cordless mouse to send data reporting the status of its battery. This information is then sent from the mouse driver 220 to the currently selected computer's mouse driver 212, 216 for communication to the selected computer.

By changing the computer mouse driver 212 or 216, the switch emulates the action of the particular type of mouse that is attached even when a computer is not the currently selected computer. The combined effect of these changes is to make the KVMA switch communicate with the computer in a manner that closely matches the way that the mouse would communicate with the computers if it were attached directly.

The keyboard driver routines stored in memory area 156 operate similarly to the mouse driver routines. These routines implement the keyboard protocols. To change the operation of the KVMA switch to more closely match the keyboard, the areas of program memory 156 associated with the keyboard drivers are re-written by downloading new keyboard driver code or data from one of the computers.

Figure 4:
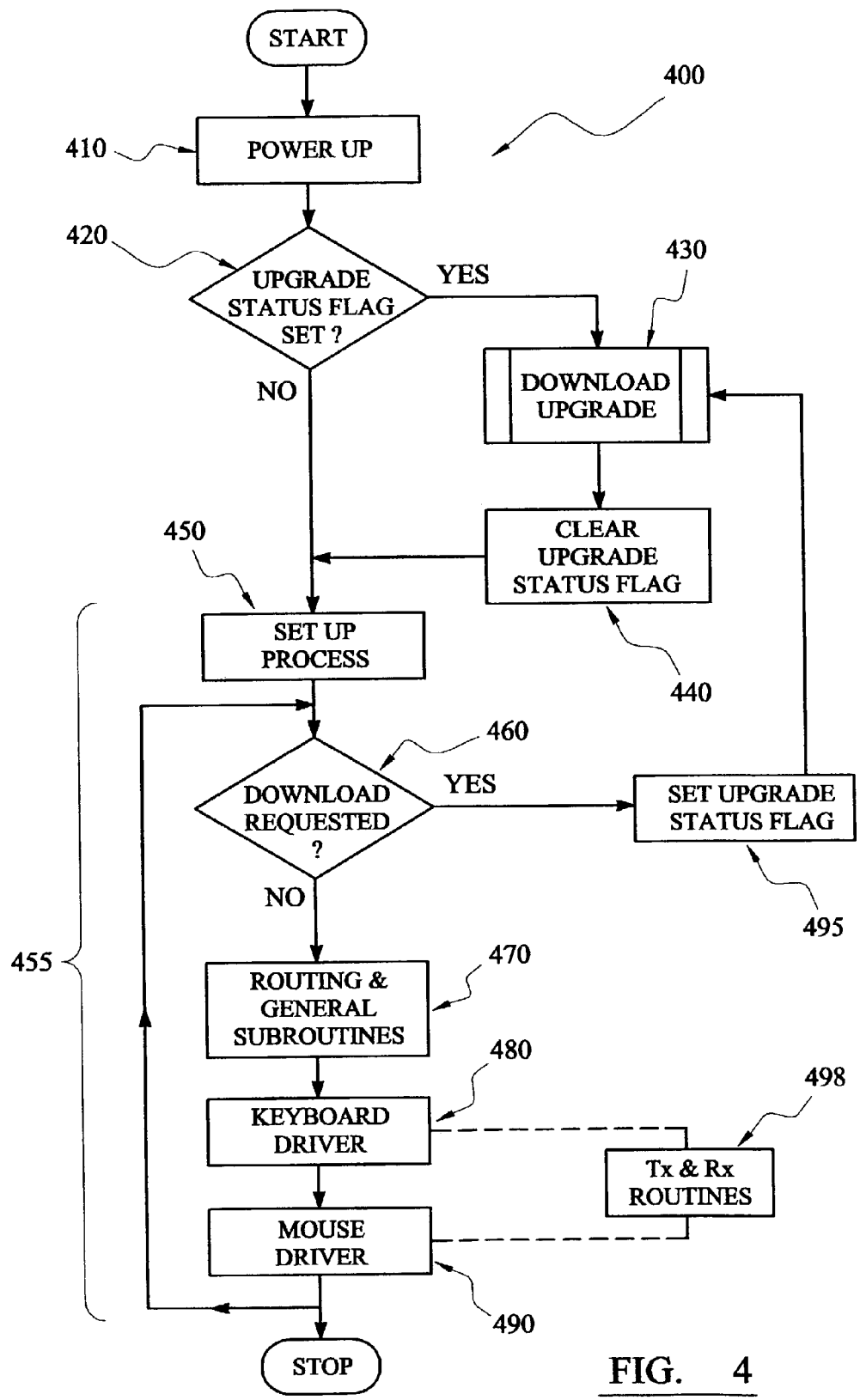
FIG. 4 shows a flow chart illustrating the general operation of the device.

FIG. 4 shows a flow chart 400 illustrating the overall operation of the microprocessor. The microprocessor 142 is able to read and write its own program memory 144 and so is capable of changing its own program code. The section of program code 158 which can download an upgrade is configured so that it will never overwrite its own program code. Consequently, the switch cannot be harmed by a faulty or partially complete driver download. When the processor is first powered up 410 it checks 420 to see whether the upgrade status flag stored in memory location 340 is set or not. If the upgrade status flag is set with then processor jumps straight to the upgrade program memory address and starts to execute the download program routine 430. Once the download has been completed the upgrade status flag is cleared 440 and the processor may continue to execute the main program 455 using any upgraded drivers. This prevents the switch from executing partially upgraded code if the power is lost half way through a driver download.

In the main control program 455, an initial set up process 450 is executed. Interrupt routines 302 are provided. The main routine determines 460 whether a download has been requested or not. If no download has been requested then the processor executes general routing 470 and other sub-routines to manage the routing of data between the KVMA console and the selected computer. When required, the main program calls 480 keyboard drivers using routines 310. The keyboard driver instructions 332 and driver data 334, which also use 498 the PS/2 transmitter and receiver routines 318, provide the keyboard drivers used to handle the transmission of data between the computers and keyboard.

Similarly, when required, the main program calls 490 the mouse drivers using mouse driver call routine 312 and the mouse driver instructions 324 and data 326 are used together 498 with the PS/2 transmission receiver routines 318 to handle the passing of data between the selected computer and mouse. The main program flow repeats until the program is terminated or a download request is detected at step 460.

When a download request is detected, then the main program flow is interrupted and the upgrade status flag 340 is set 495. Processor 142 then jumps to the download program code 344 and starts executing 430 the download routine. The download process will now be described in greater detail with reference to FIGS. 5 and 6.

Figure 5:
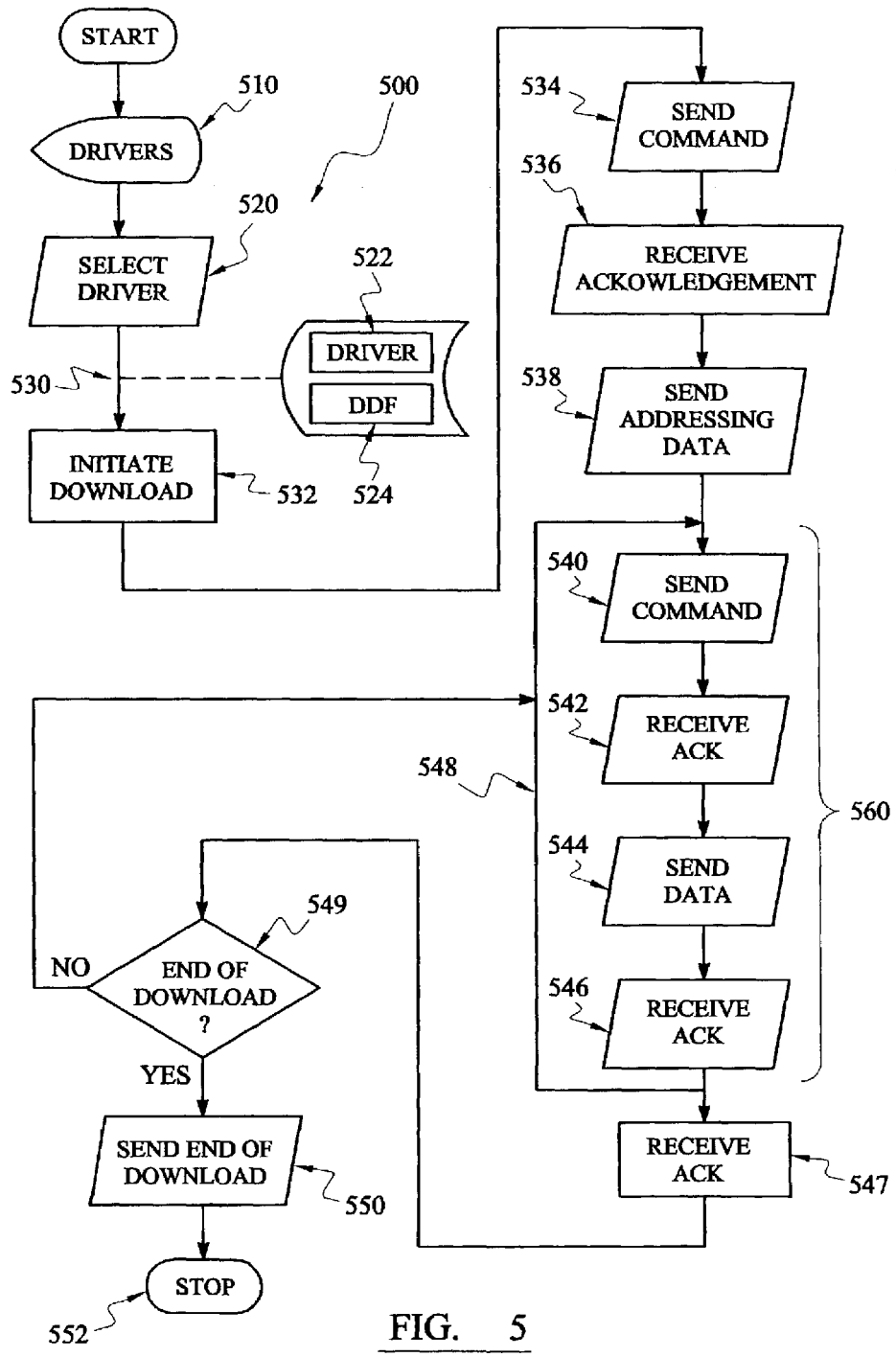
FIG. 5 shows a flow chart illustrating a method of downloading software to the device.

FIG. 5 shows a flowchart illustrating a driver download program 500 that is run on the first or second computer to download mouse and keyboard drivers into the KVMA switch. The download program may also be used for a complete firmware upgrade by re-writing the main program memory area 152 or entire memory area 350.

Figure 6:
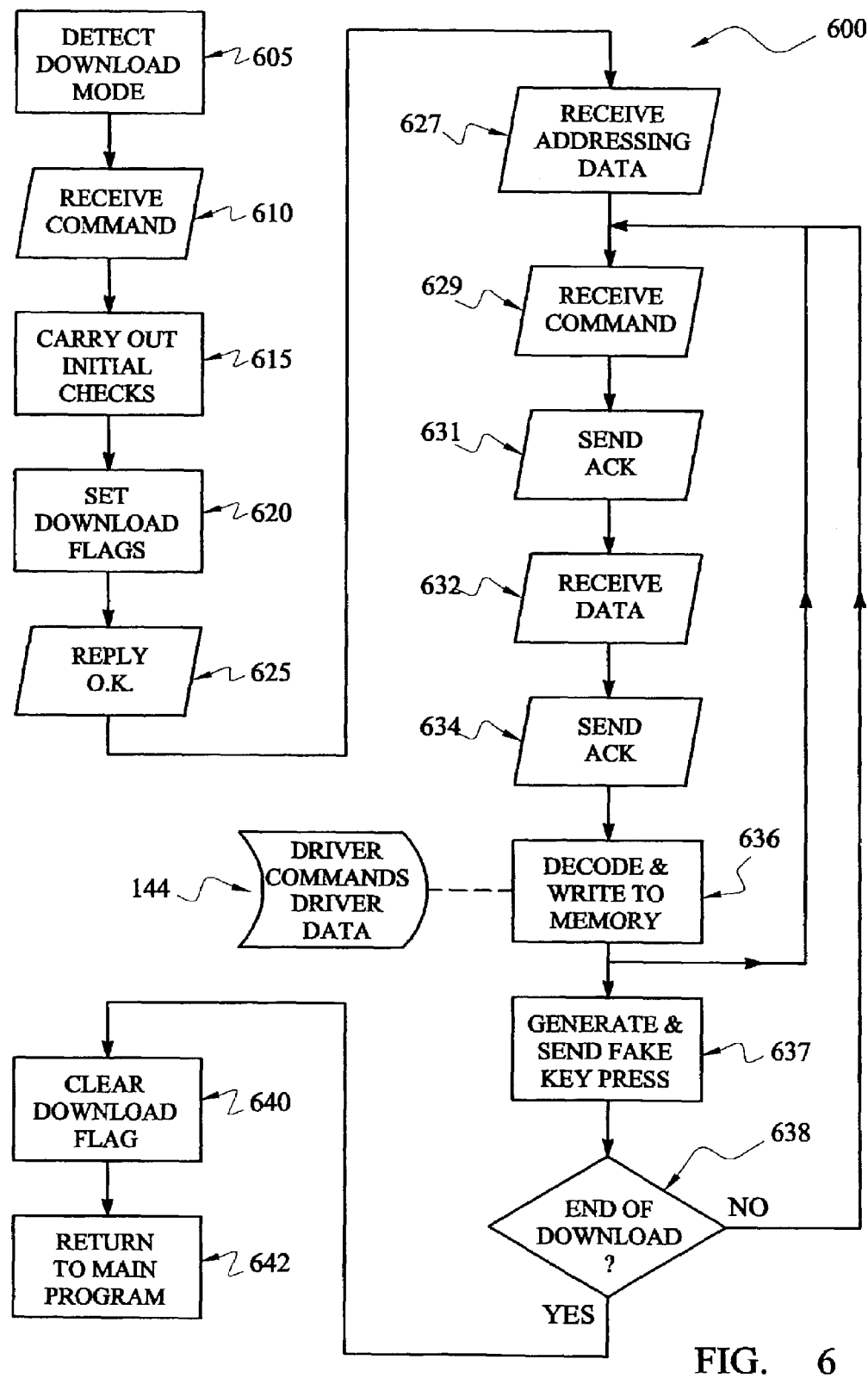
FIG. 6 shows a flow chart illustrating a method by which the device downloads software.

FIG. 6 shows a flowchart 600 illustrating the KVMA switch download program 344 executed by the microprocessor 142 to handle re-writing of the mouse driver, keyboard driver or main program memory regions.

The available drivers are displayed 510 to a user. The user then inputs a selection 520 of a driver and the selected driver data 522 (including driver instructions and driver data) is retrieved 530 from memory. The keyboard and mouse drivers 522 are provided as pre-assembled program code for the KVMA switch's processor together with driver data that is loaded into the program memory 144 and may be used in the format of a look up table. This allows the driver to be downloaded easily because the download program can take the program code and look up data and send it to the KVMA switch with the appropriate address information.

Alternatively, the driver may be provided as a driver definition file 524 that defines the way the driver will work but does not provide the raw program code or data values. The driver definition file is processed by a routine of the download program to create the driver code and data to be downloaded.

The KVMA switch is set into a driver download mode by pressing and holding the selection switch for a pre-determined time period, or alternatively using a keyboard hotkey sequence. The KVMA switch determines that it has been set into a download mode 605 and responds by lighting both selection lights. This causes the KVMA switch to stop executing the main loop 455 and jump to the download program code 430 that performs the upgrade by receiving new program code from the computer and loading it into the processor's program memory 144. The required keyboard or mouse driver code is downloaded from the computer to the KVMA switch over the PS/2 style keyboard connection 130,130'.

Microprocessor 142 can read and write its own program memory 144 and so is capable of upgrading its own program code. The download program 344 is configured so that it will never overwrite its own program code. As illustrated in FIG. 4 an upgrade status flag is used to prevent the KVMA switch from attempting to execute partially downloaded code.

The driver data to be transferred is encoded within data sequences that form part of the PS/2 keyboard communication protocol. A keyboard sequence is chosen in preference to a mouse sequence because the more basic operating systems support keyboards without requiring special drivers and have suitable BIOS services.

In particular, the BIOS provides a "set typematic rate/delay" command and can also detect key press events from a keyboard. For example for a typical IBM personal computer, the keyboard BIOS provides service 16 (hex) sub-function 3 that enables the typematic rate/delay to be set and service 16(hex) sub-function 0 that enables the scan code of keyboard characters to be read. The "set typematic rate/delay" command enables seven bits of data to be transferred from the computer to the KVMA device in every four byte sequence (command byte, acknowledge byte, data byte, acknowledge byte). Therefore two such transfer sequences are used to transfer the 14 bit program instructions used by the microprocessor program memory 144.

The microprocessor generates faked keystrokes so that the KVMA can signal to the computer the 16 possible states of a nibble (4 bits) of data. A sequence of two such faked keystrokes therefore enables a byte of data to be transmitted. For example, the KVMA switch may send a sequence of three hexadecimal bytes such as 29 F0 29 which is the data which would be generated by pressing and releasing the space key of a PC style keyboard. Sixteen such faked keystrokes are used by the KVMA switch.

The number of keystrokes and their exact meaning and use is not important provided that their meaning may be interpreted by the download program 344. The fake keystrokes are for keys that perform minimal computer functions when pressed and released on their own so that they cause minimum disruption if received by the computer in error. The faked keystroke sequences also allow the KVMA switches to send data to the computer enabling it to communicate areas of free memory that may be used for driver downloads and also the identifiers for the versions of the currently loaded drivers.

By transmitting data to the KVMA device using the "set typematic rate/delay" sequence and receiving confirmations and data from the KVMA device using faked keystrokes the computer is able to write to the program memory within the KVMA switch and check that the device has been programmed correctly by receiving confirmation data in return. The computer can therefore reliably download keyboard or mouse drivers into the KVMA device or fully upgrade the KVMA device's firmware. Data is sent to the KVMA device using the "set typematic rate/delay" ("str/d") sequence instead of sending a command as the download program on the computer does not access low level communications.

The download program on the computer is initiated 532 and a trigger data byte is sent 534 over the keyboard cable to the processor 142 using the str/d sequence. The KVMA switch receives 610 and recognises the trigger byte and carries out internal checks 615 to ensure that it is ready to accept a download (eg. that the supply voltage is within limits). The switch download program 344 then sets the upgrade download status flag 620 to indicate that a download is in progress and generates a pre-defined fake key press sequence which is transmitted 625 to the computer to reply that it may start the download.

The computer receives the fake key press acknowledgement 536 and sends addressing information 538 to the processor, using the str/d sequence, that identifies the location of program memory 144 that is to be altered. The locations for the keyboard and mouse driver code and the associated free memory are preferably fixed and pre-defined. Alternatively, these memory areas may be dynamic and may be determined by the computer by requesting information from the processor. The processor receives the addressing data 627 so that it knows where to store the driver data to be downloaded.

The computer download program 500 encodes the driver data to be sent to the KVMA switch within the keyboard "set typematic rate/delay" byte sequence 560. As explained above, this is a four byte data transfer sequence. Firstly, the computer sends a command 540 which is received 629 by the KVMA switch. This command notifies the KVMA switch that the next transmitted byte will be the "typematic rate/delay" value, ie a data byte. The KVMA switch transmits "FA" to the computer 631 as an acknowledgement of receipt of the command.

On receipt of acknowledgement 542, the computer download program 500 sends the data byte 544, corresponding to the typematic rate/delay value, but actually comprising driver data. The most significant bit of this byte is 0 and so seven bits of driver information are transmitted. The KVMA switch receives the seven bits of driver data 632 and again sends "FA" as acknowledgement 634 of receipt of the data byte. The driver data is decoded 636 by the processor and the driver command or driver data is written to the appropriate part of program memory 144. On receipt of the KVMA switch acknowledgement 546 the four byte transfer sequence is repeated 548 so as to provide two sequences of data transfer to set the values of each of the fourteen bit program memory. After this, the processor generates and transmits 637 fake key press data confirming that the encoded data has been received and decoded properly and which is received 547 by the download program so that it can continue downloading data. If no confirmation is received by the computer, then the download program resends the data that was not properly downloaded.

The download program 500 determines whether the download has been completed 549 and if not continues the download using the data transfer process 560. When it is determined that the download has been completed then the computer sends end of download data 550 to the KVMA switch to indicate the end of the download process. The download program running on the computer then terminates 552.

On receipt of the end of download data, the KVMA switch determines 638 that the download has been completed and clears the upgrade download flag 640 to indicate that the download process has been successful. The download program then returns 642 to the main control program to allow the KVMA switch to continue operating in a switching mode and using the upgraded driver data.

Either driver code or driver data for the mouse or the keyboard can be downloaded in this manner. As well as downloading new drivers into the KVMA switch, the keyboard and mouse drivers and main control program code can be assembled in the computer and the combined program downloaded. In this case entire program memory 350, excluding the download program routine and data transfer routines associated with it, can be upgraded using the driver download process. As will be appreciated this is more complicated but can be appropriate when extra flexibility is required.

A keyboard or mouse driver includes driver instructions 324, 332 and driver data 326, 334 stored in the program memory. The driver data can be formatted in a look up table which is accessed by the driver code in order to customise the driver instructions to produce the required driver. The driver look up data may also be downloaded into the processor's EEPROM memory 150. Using look up data simplifies the process of creating multiple drivers for different keyboards and mice and it avoids the need to write specific program code for every model of keyboard or mouse. Instead, more generalised code is used with variable look up data. Look up data is particularly helpful in implementing mouse drivers as the sequence of bytes that needs to be identified can be relatively long.

The look up data contains various types of data depending on the type of the mouse that the driver is for. As each program memory address is fourteen bits wide, each location is capable of storing a data byte with information about that byte. Examples of the various types of look up data used follow:

(1) Data that indicates the conditions under which the driver code may look for certain sequences. For example:
  (a) 000 hex—look for the following data sequence being sent from the computer when the emulated mouse is in any mode.
  (b) 003 hex—look for the following data sequence only when the mouse is in Intellimouse mode (mode 3).
(2) Data that is used by the driver code to identify sequences of bytes. For example the following code searches for the byte sequence F3 14 F3 28 F3 3C being sent from the computer:

1F3, 114, 1F3, 128, 1F3, 13C.

(3) Data that tells the driver code what to do when certain sequences of data have been detected.
(4) State information that tells the driver code what state the mouse is in when byte sequences have been detected. For example:
  200 hex—take no action;
  201 hex—send the following sequence of bytes to the computer and don't change the mouse mode;
  231 hex—send the following sequence of bytes to the computer and change the mouse mode to mode 3.
(5) Data that may be sent to the computer which responds to a query from the computer. For example, the following data would cause the driver to send the data sequence 32 1F 23 0B 0B 02 21 to the computer:

332 hex
31F hex
323 hex
30B hex
30B hex
302 hex
321 hex
500 hex (end of sequence—sending more data).
(6) Pointers to other locations in the data lookup table.
(7) Data that defines the sequences of data that will be sent to the shared keyboard or mouse. For example, to send the Intellimouse query sequence (F3 C8 F3 64 F3 50) to the shared mouse the following look up data can be used:
4F3 hex
4C8 hex
4F3 hex
464 hex
4F3 hex
450 hex For example, the following look up data may be used by the mouse driver code 324 that is dealing with the mouse emulation to the computer 212,216. This codes tell the driver code to look for the sequence regardless of whether the mouse is currently in a standard two button mode (mode 0), Intellimouse mode (mode 3), or Intellimouse Explorer Mode (mode 4). If the sequence F3 14 F3 28 F3 3C is detected then the mouse should not be changed and the sequence 32 1F 23 0B 0B 02 21 should be sent to the computer:

| | |
|---|---|
| 000 | look for the following sequence in all modes |
| 1F3 | look for F3 |
| 114 | look for F3 14 |
| 1F3 | look for F3 14 F3 |
| 128 | look for F3 F3 48 |
| 1F3 | look for F3 14 F3 28 F3 |
| 13C | look for F3 14 F3 28 F3 3C |
| 201 | sequence detected do not change mouse mode and send next bytes to computer |
| 332 | send byte 32 to computer |
| 31F | send byte 1F to computer |
| 323 | send byte 23 to computer |
| 30B | send byte 0B to computer |
| 30B | send byte 0B to computer |
| 302 | send byte 02 to computer |
| 321 | send byte 21 to computer |
| 500 | end - send no more data |

Very simple drivers may be coded more efficiently by implementing them without the use of a look up table. Others may be created more efficiently by implementing only a small portion of the driver's functionality with the aid of driver data look up tables. Some drivers may be most efficiently implemented using look up data tables that contain one or more of the seven types of data identified above.

The format of the data within the look up data may be arranged in different ways depending upon the model of the keyboard or mouse. This is because the downloadable driver code 324, 332 is itself variable and therefore may be arranged to interpret the look up data in a manner that the code designer considers to be most advantageous.

Many different KVMA switches may be provided using the interface device of the present invention and mixtures of connections that use PS/2, USB, Sun and ADB keyboard or mouse signalling. Also matrix KVMA switches may be constructed to support multiple KVMA console connections. Matrix KVMA switches can make use of multiple processors. In such cases, different parts of the keyboard or mouse driver is hosted by different processors.

Figure 7:
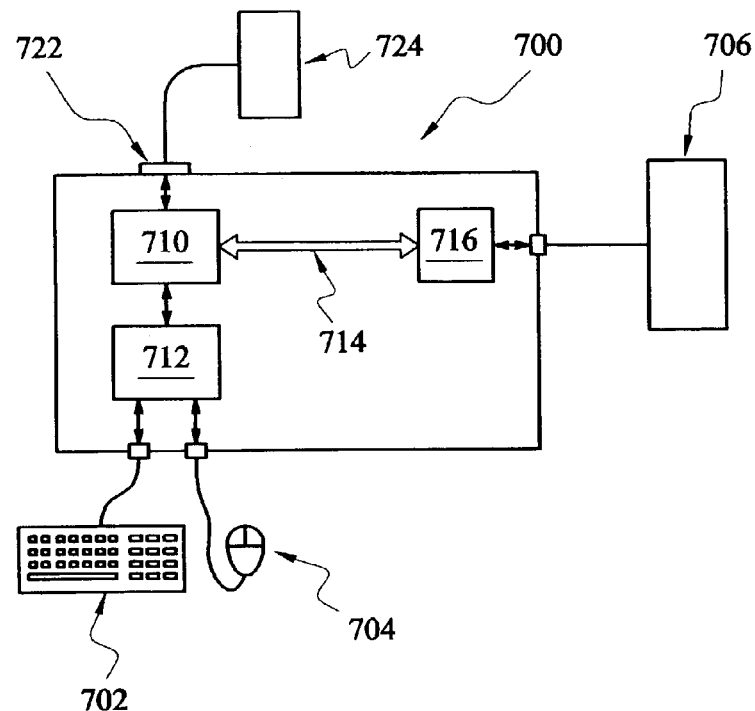
FIG. 7 shows an alternative KVM switch including a device according to the invention.

For example, FIG. 7 shows a device 700 for interfacing a USB keyboard 702 and mouse 704 to a USB computer 706. A download upgradable microcontroller 710 similar to controller 140 shown in FIG. 1 is provided together with a USB host controller device 712 in order to communicate with the USB keyboard or mouse. Processor 710 is connected by an internal i2c bus 714 to a further processor 716 that implements other portions of the keyboard or mouse driver for controlling communication with the computer 706. Processor 716 is a flash upgradable USB peripheral controller processor that implements the keyboard and mouse control routines for computer 706 by emulating the presence of a USB keyboard and mouse to the computer 706 that is connected to the combined keyboard and mouse connector 720.

The driver or main program code of either or both processors can be upgraded. Re-programming of the processors is carried out by sending upgrade data between them via the internal bus 714. The various elements of the drivers may be implemented by different processors rather than being implemented by a single processor. Further, the processors do not need to be located in the same physical enclosure. For example in an alternative embodiment, one or more of the processors may be located within the connector hood of a connection cable that forms part of a KVMA switch when it is attached to a main system unit.

The device 700 can be upgraded by downloading the upgrade data over the USB connection 720. The upgrade data can then be used to upgrade processor 710 and/or processor 716. Alternatively, a dedicated RS232 serial port 722 connected to processor 710 can be provided so that upgrade data can be downloaded from a separate computer 724.

Figure 8:
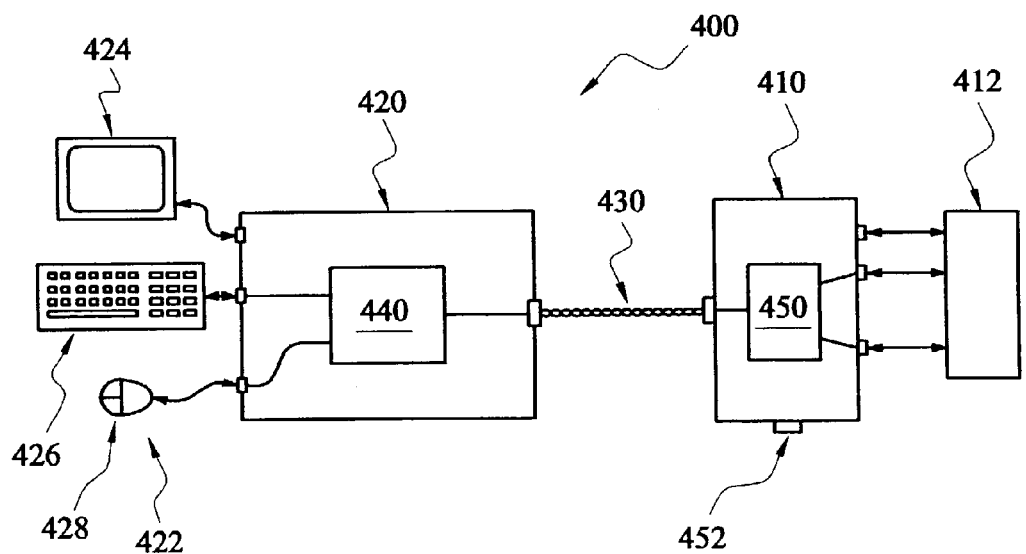
FIG. 8 shows a KVM extender including devices according to the invention.

FIG. 8 shows a KVMA extender 400 comprising a local unit 410 connected to computer 412 and a remote unit 420 connected to KVM console 422 comprising a monitor 424, a keyboard 426 and a mouse 428. The remote and local units are connected by a 4-pair twisted wire cable 430 which transmits keyboard, mouse and video signals between the remote units.

As will be apparent to a man of ordinary skill in the art, FIG. 8 is schematic and the remote and local units include other items of equipment which are not shown in FIG. 8 for the sake of clarity and as they are substantially conventional. The discussion of FIG. 8 focusses on the features of the invention.

The mouse 422 and keyboard may be a PS/2, USB, Sun or ADB device and is connected by an appropriate cable and connector. Similarly, the computer 412 may be a PS/2, USB, Sun or ADB compatible computer connected to the local unit by suitable cables and connectors. The interface protocol used by the computer, keyboard and mouse do not need to be of the same type as the signals that are transmitted between the remote and local units via the twisted pair cable are not PS/2, USB, Sun or ADB signals and the remote and local units perform data protocol conversions.

Remote unit 420 includes a microprocessor based micro-controller 440 similar to the controller 140 shown in FIG. 1. Similarly, the local unit 410 includes a micro-controller 450 similar to controller circuit 140. Micro-controller circuits 440 and 450 both include a microprocessor with on board re-writeable flash program memory. Controller 450 includes processor program code including keyboard and mouse driver code and main program code. There is also provided a communication routine which handles data conversion and transmission and reception of data across the twisted pair cable 430. Similarly, the program memory for the processor of micro controller 440 includes mouse and keyboard driver code, main program code and communications routines to handle data conversion and the transmission and reception of data over the twisted pair cable 430. The program memory for each micro controller also includes download program routines configured so as not to overwrite themselves.

Figure 9:
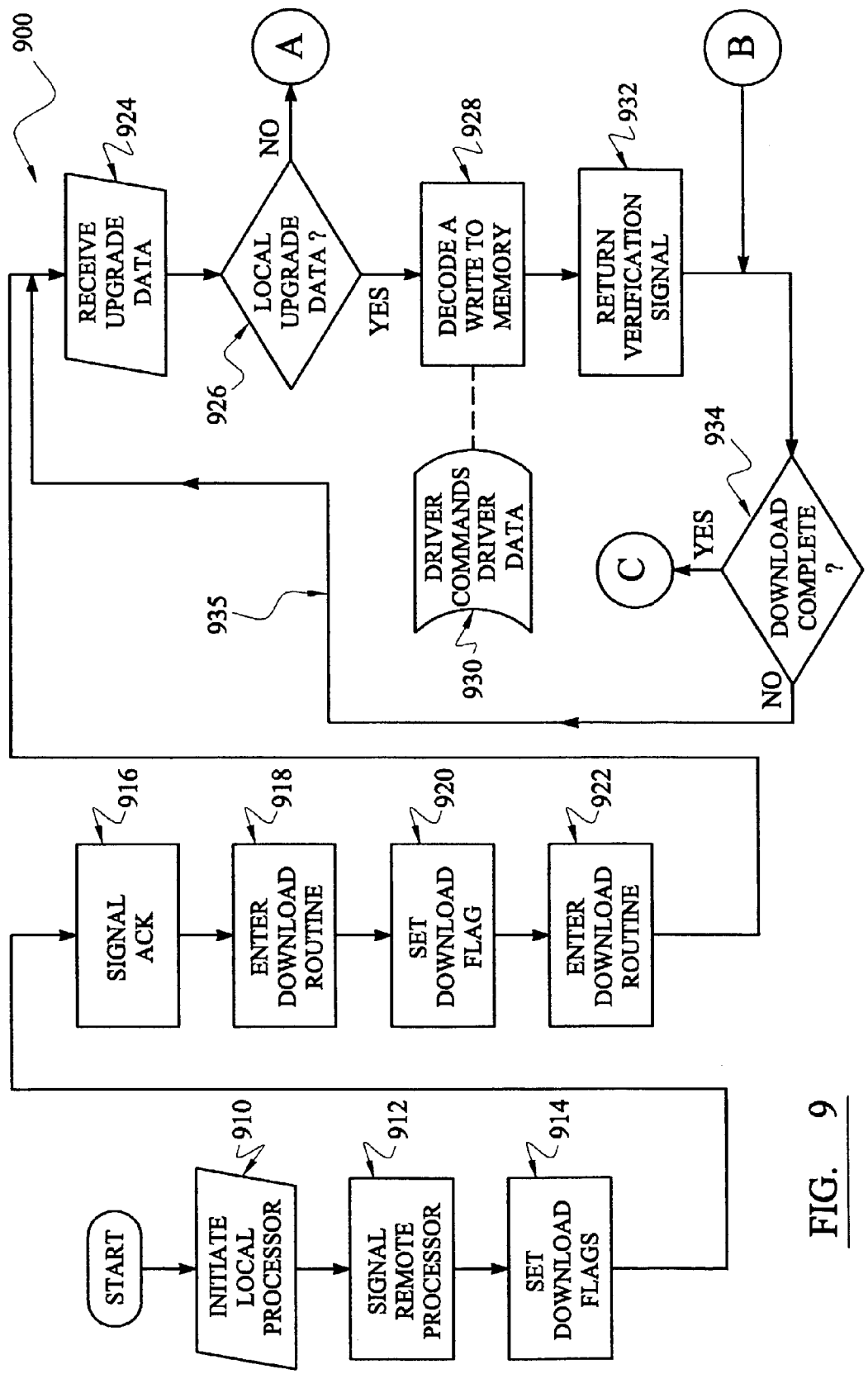
FIG. 9 shows a flowchart illustrating a method of downloading data to the devices of the KVM extender shown in FIG. 8.
Figure 9:
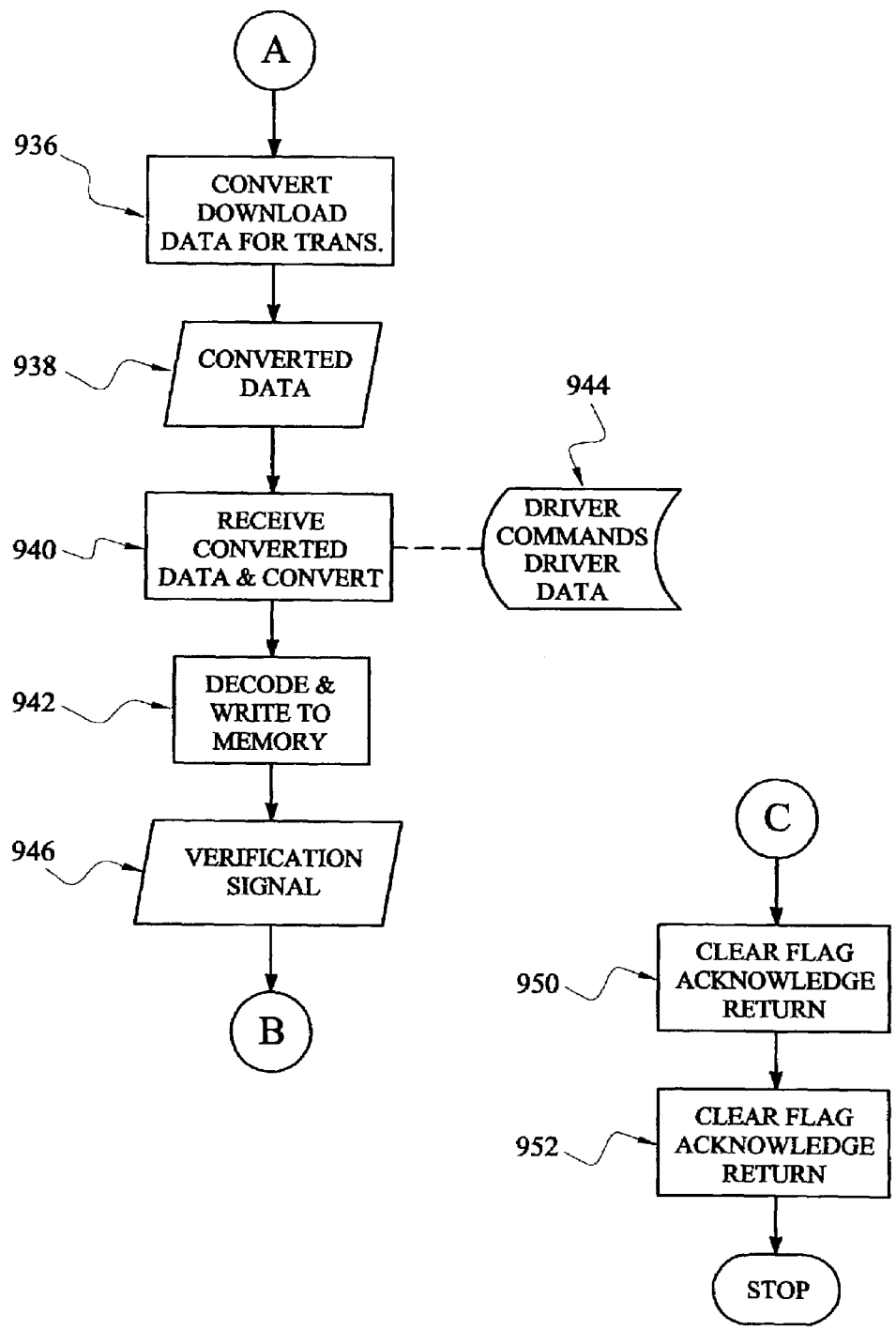

FIG. 9 shows a flowchart 900 illustrating the process by which upgrade data is downloaded to processors 440 and/or 450. Computer 412 includes an upgrade data download program similar to that discussed previously with reference to FIG. 5. The transmission of upgrade data between the computer 412 and local unit 410 can be carried out using the PS/2 keyboard connection as described previously.

A switch 452 of the local unit is operated to initiate 910 local processor 450. The local processor signals 912 the remote processor on detection of an update request. The remote processor 440 enters a download mode and sets 914 download status flag and returns an acknowledge 916 to local processor 450 to indicate it is ready to receive downloaded upgrade data and starts executing 918 a download program. On receiving the acknowledgement signal, local processor 450 also sets a download status flag 920 and jumps from its main control program to a download program and starts executing 922 the download routine.

The local processor 450 receives upgrade data 924 and determines 926 whether it is upgrade data for the local processor or the remote processor. Local upgrade data is decoded and driver command data and driver look up data are written 928 to the local processor program memory 930. The local processor returns verification signals 932 to the computer 412 and then determines 934 whether the download of upgrade data has been completed 934. If not, then further upgrade data is downloaded 935 from the computer 412.

If in step 926 it is determined that the upgrade data is for the remote processor, then local processor 450 converts the downloaded data 936 into a format for transmission over the twisted pair cables 430. The converted data is then output 938 and transmitted across the twisted pair cable to the remote processor. The converted data is received by the remote processor and is then converted 940 back into the format used by the remote processor. The converted data is decoded 942 and driver command data and driver look up data written to the appropriate driver locations in remote processor program memory 944. A verification signal is output 946 by the remote processor to the local processor over the cable 430 to verify safe completion of the data transfer. The local processor then again determines 934 whether the download is completed and if not further data is downloaded.

When it is determined 934 that the download has been completed, the remote processor is signalled by the local processor. The remote processor clears its upgrade status flag, transmits acknowledgement to the local processor and returns to its main control program 950. On reception of the remote processor acknowledgement, local processor 450 similarly clears its upgrade status flag and transmits acknowledgement of completion of the data download to the computer 412 and then returns to its main control program 952. The process of updating the local and remote processors is then complete. In this way, the download program running on the computer 412 is able to reprogram and verify the flash program memory within processors 440 and 450.

Remote processor 440 emulates the action of the computer to the keyboard 426 and mouse 428. Processor 450 emulates the action of a keyboard and mouse to computer 412. The keyboard and mouse driver programs within the processors 440 and 450 are structured in a similar way to that for the KVMA switch 110 described previously. Consequently, keyboard and mouse drivers may be downloaded from the computer 412 so as to change the characteristics of the extender to more closely match the keyboard and mouse connected to it to the computer 412. In order to change the keyboard or mouse drivers, the driver instructions and/or the look up data are updated either independently or at the same time.

Figure 10:
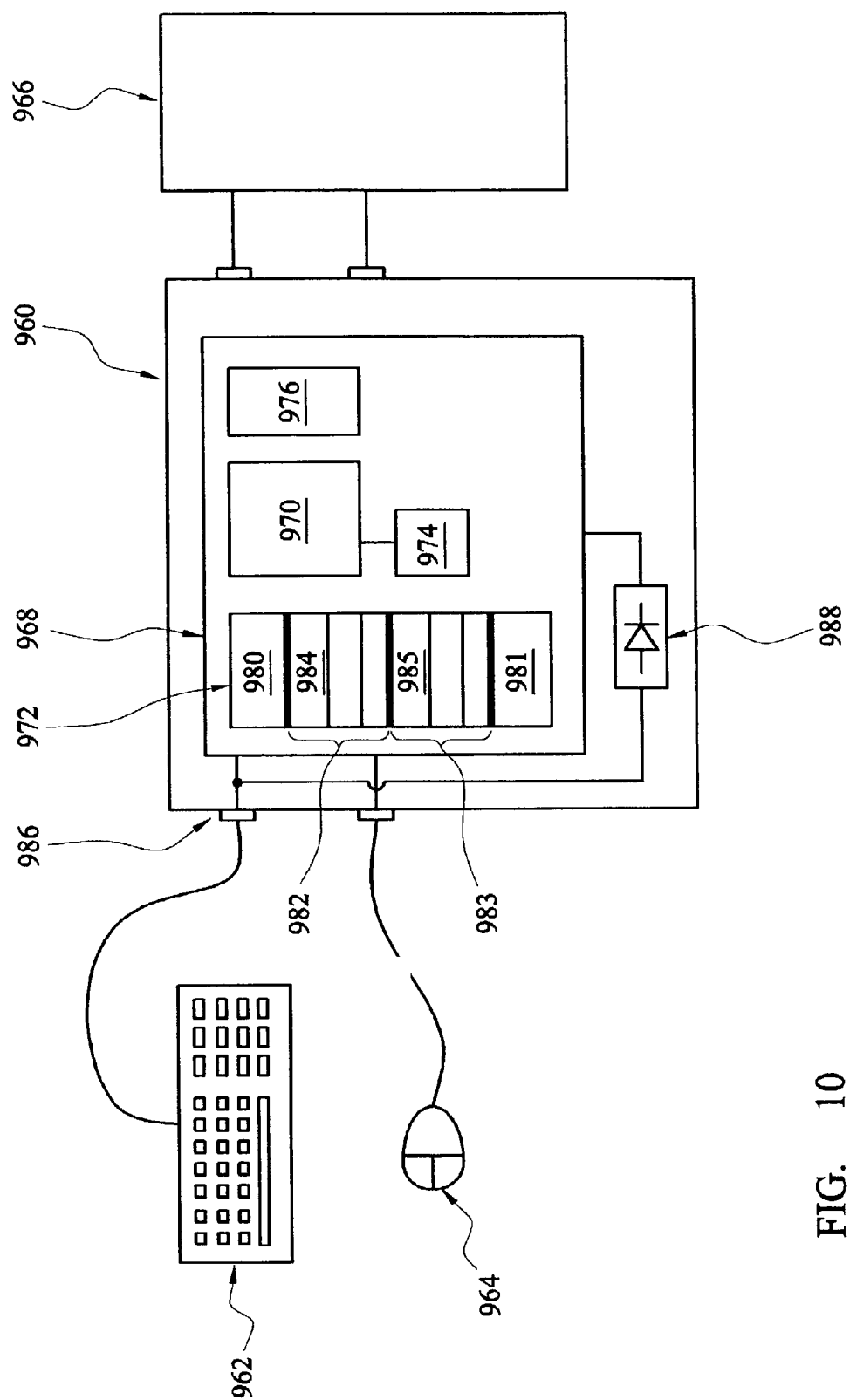
FIG. 10 shows a schematic block diagram of a further alternative device according to the invention.

FIG. 10 shows a cost effective keyboard and mouse interface converter 960 that enables a PS/2 keyboard 962 and mouse 964, or instead a PS/2 style KVMA switch, to be connected to a computer 966 using a Sun keyboard and mouse protocol. The interface device 960 may be constructed in an adapter format or may be constructed on a small circuit board that is integrated within part of a cable housing assembly.

The interface converter 960 includes a micro-controller 968 similar to micro-controller 140 and including microprocessor 970 having onboard flash re-writeable program memory 972, RAM 974, and EEPROM 976. As for the previous embodiments, program memory 972 stores a main control program routine 980, a non-rewriteable download program routine 981 and mouse 982 and keyboard 983 drivers. As previously, the main control program 980 and drivers emulate the presence of a PS/2 computer to the PS/2 style keyboard and mouse and emulate the presence of a Sun keyboard and mouse to the Sun computer. However, in this embodiment, the keyboard and mouse driver control routines 982, 983 also have associated routines 984, 985 to handle the conversion between PS/2 and Sun protocols 984, 985. Data transmitted using the PS/2 protocol from mouse 964 is processed by the controller 968 and converted for transmission to the computer 966 using the Sun protocol.

It is easier to re-program the flash program memory 972 using the PS/2 keyboard port 986 rather than the Sun keyboard port to which the computer 966 is connected. However, in normal operation the converter's PS/2 keyboard port 986 is configured for connection to a PS/2 keyboard not a computer. Also if the converter circuit is moulded into a cable assembly it would be undesirable to provide a switch or jumper which would enable the converter to be put into upgrade mode.

In order to address these problems, the converter 960 allows the function of the PS/2 keyboard port 986 to be reversed and detects this reversal in order to enter the upgrade mode. In normal operation, the Sun computer 966 supplies power to the converter and the keyboard and mouse draw power from it. If the Sun computer is disconnected and a PC compatible computer's keyboard port is connected to the PS/2 port 968 then power is applied to the converter's keyboard port by the PC compatible computer rather than being drawn from it.

The converter therefore includes a power detection circuit 988, using a diode, which allows the processor to detect this condition and automatically enter the upgrade program download mode. The download program code 981 includes commands to reverse the operation of the convertor's PS/2 keyboard port 986 to receive upgrade information from a download program running on the computer connected to the PS/2 port 986 using the PS/2 based download procedure described previously.

The preceding description has given an example of how upgrade data can be transmitted from the computer to the KVM device. Other methods can be used to transmit the upgrade data between the computer and KVM switch. There follows a number of examples of how upgrade data can be encoded within a standard PS/2 data sequence, so as to further illustrate the general principles of the invention as explained above.

The current embodiment described above uses a specific keyboard "set typematic rate/delay" command to carry upgrade data from the computer to the KVM device and "faked key presses" that are used to carry data from the KVM device to the computer. The keyboard "set typematic rate/delay" command is particularly suitable as it enables 7 bits of data to be transferred in one sequence. However, other PS/2 data sequences can be used to carry the upgrade data, for example, the mouse sequences briefly described.

The following mouse data sequences could be used to send data from the computer to the KVM device. These allow because fewer bits of data can be transferred in a single sequence, compared to the keyboard sequence described above.

In a first example, in order to send data from the computer to the KVM device using a PS/2 mouse sequence the 'Set Sampling Rate' command could be used. In normal use, this command sets the mouse sampling rate as one of seven possibilities. The BIOS function is: Int 15 Hex, Function C2 Hex, Subfunction 02 Hex. The PS/2 data sequence includes four steps: (1) computer sends F3 to mouse; (2) mouse sends FA (as an acknowledge) to the computer; (3) computer sends sampling rate (one of 7 possibilities 0A, 14, 28, 3C, 50, 64, C8); and (4) mouse sends FA (as acknowledgement) to computer. The command can be used to transfer 2 bits of information from the computer to the KV device (as seven states is not quite enough for 3 bits of information).

In a second example, a 'Set Resolution' command can be used to send data from the computer to the KVM device using a PS/2 mouse sequence. In normal use, this command is used to set the mouse resolution as one of four possibilities. The BIOS function is: Int 15 Hex, Function C2 Hex, Subfunction 03 Hex. The PS/2 data sequence includes: (1) computer sends E8 to mouse; (2) mouse sends FA (as acknowledgement) to the computer; (3) computer sends resolution (there are 4 possibilities 00, 01, 02, 03); and (4) mouse sends FA (as acknowledgement) to the computer. Hence, this data sequence can be used to transfer 2 bits of information from the computer to KVM device.

In a third example, data can be sent from the computer to the KVM device using a PS/2 mouse sequence for the 'Set Scaling' command. In normal use, this command is used to set the mouse scaling (for which there are two possibilities). The BIOS function is: Int 15 Hex, Function C2 Hex, Subfunction 06 Hex—parameter is passed in register BL. If value is 01 Hex then 1 to 1 scaling is selected, and if value is 02 Hex then 2 to 1 scaling is selected. The PS/2 data sequence is generally: (1) computer sends E6 (1 to 1 scaling) or E7 (2 to 1 scaling) to mouse; (2) mouse sends FA (as acknowledgement) to the computer. This data sequence could be used to transfer 1 bit of information from the computer to the KVM device by sending E6 or E7. A sequence of E6 and E7 data can be used to transfer information, for example, if E6 is used to represent 0 and E7 to represent 1, then 86 Hex could be transferred as E7,E6,E6, E6,E6,E7,E7,E6.

Data can be transferred from the device to the computer by encoding the data into the mouse data report instead of using "faked keystrokes". A typical mouse report is three bytes long, although other extended or mouse specific formats are possible. The first byte can give the status of the left and right hand buttons and sign/overflow information relating to the X and Y coordinate data held in the next two bytes. Faked mouse button press data can be generated by the device in order to communicate data to the computer. The mouse button state can be read by a computer program and so enables data to be transferred. However this is not as preferred as using faked keyboard keystrokes as faked mouse button presses are more likely to have undesirable effects (e.g. with other programs running on the computer).

It will be appreciated that not all possible combinations of the different features of the invention have been described in detail above. Some of the features of one embodiment of the invention may be used in combination with features of alternate embodiments of the invention, and in different permutations, as will be appreciated by one of ordinary skill in this art. Hence, the invention is not considered to be limited to the specific embodiments described, but is considered to encompass variations, combinations and permutations of the specific features as will be apparent to a skilled man.

What is claimed is:

1. A KVM or KVMA switch or extender for interfacing an input device and a computer connected to the KVM or KVMA switch or extender, the KVM or KVMA switch or extender including:
a microprocessor in communication with a memory; and a PS/2 interface; said memory storing download instructions and having a re-writable memory area for storing input device driver data downloadable by the microprocessor from the computer using the download instructions, wherein the download instructions download the input device driver data from the computer via the PS/2 interface using a PS/2 input device communication protocol within a "set typematic rate/delay" data sequence, and wherein the download instructions also generate fake key press data which is transmitted from the KVM or KVMA switch or extender to the computer via the PS/2 interface to provide confirmation or data to the computer to allow input device driver data to be reliably downloaded, the microprocessor being programmed to extract the input device driver data from the input device driver data transmitted to the KVM or KVMA switch or extender using the PS/2 input device communication protocol and to save the input device driver data in the re-writable memory area, and the microprocessor further being programmed to use the downloaded input device driver data to enable data transmission between the computer and the input device via the KVM or KVMA switch or extender.

2. A device as claimed in claim 1, in which input device driver data is re-writeable to the memory independently of other data stored in the memory.

3. A device as claimed in claim 1, in which the download instructions are protected from being overwritten by downloaded data.

4. A device as claimed in claim 1, in which the device driver data includes device driver instructions and driver data.

5. A device as claimed in claim 4, in which the driver data includes data selected from: data indicating conditions under which the driver code may look for certain data sequences; data identifying sequences of transmitted bytes; data indicating what the driver does when certain sequences of data are detected; state information telling the driver code what state the device is in when byte sequences are detected; data sent to the computer in response to a query from the computer; pointers to the location of other data items; and data that defines the sequences of data sent to the input device.

6. A device as claimed in claim 5, in which the driver data is stored in a look up table.

7. A device as claimed in claim 6, in which the device includes an EEPROM accessible by the processor and the look up table is stored in the EEPROM.

8. A device as claimed in claim 1, in which the memory includes a free area allocated to device driver data.

9. A device as claimed in claim 8, in which the free area is contiguous to device driver memory areas.

10. A device as claimed in claim 1, in which the memory also stores data transmission protocol conversion data.

11. A device as claimed in claim 1, in which the memory stores data transmission and/or reception routines.

12. A device as claimed in claim 1, in which the memory stores a download status data item.

13. A device as claimed in claim 1 in which the input device driver data is mouse and/or keyboard driver data.

14. A device as claimed in claim 1, in which the memory stores main control program data which is re-writable.

15. A method for configuring a KVM or KVMA switch or extender for interfacing an input device and a computer connected to the KVM or KVMA switch or extender, the method including:
downloading input device driver data from the computer to the KVM or KVMA switch or extender within a "set typematic rate/delay" data sequence via a PS/2 interface using a PS/2 input device communication protocol, and transmitting fake key press data from the KVM or KVMA switch or extender to the computer via the PS/2 interface to provide confirmation or data to the computer to allow input device driver data to be reliably downloaded;

extracting input device driver data from the input device driver data downloaded using the PS/2 input device communication protocol;

storing the input device driver data in a re-writable memory area of a memory in communication with a microprocessor in the KVM or KVMA switch or extender; and the microprocessor using the downloaded input device driver data to enable data transmission between the computer and the input device via the KVM or KVMA switch or extender.

16. A method as claimed in claim 15, and including using a download program stored in the memory to download the input device driver data.

17. A method as claimed in claim 15, in which the input device driver data is stored independently of data already stored in the memory.

18. A method as claimed in claim 15, in which input device driver data is transmitted within a keyboard data sequence.

19. A method as claimed in claim 15, in which input device driver data is transmitted within a mouse data sequence.

20. A method as claimed in claim 15, in which input device driver data is transmitted within a "set typematic rate/delay" data sequence.

21. A device for interfacing an input device and a computer connected to the device, the device including:

a microprocessor in communication with a memory, said memory storing download instructions and having a re-writable memory area for storing input device driver data downloadable by the microprocessor from the computer using the download instructions, wherein the download instructions download the input device driver data using a PS/2 input device communication protocol within a "set typematic rate/delay" data sequence, the microprocessor being programmed to extract the input device driver data from the "set typematic rate/delay" data sequence and to save the input device driver data in the re-writable memory area, and the microprocessor further being programmed to use the downloaded input device driver data to enable data transmission between the computer and the input device.

22. A method for configuring a device for interfacing an input device and a computer connected to the device, the method including:

downloading input device driver data from the computer to the device within a "set typematic rate/delay" data sequence using a PS/2 input device communication protocol;

extracting input device driver data from the "set typematic rate/delay" data sequence;

storing the input device driver data in a re-writable memory area of a memory in communication with a microprocessor in the device; and the microprocessor using the downloaded input device driver data to enable data transmission between the computer and the input device.

* * * * *